United States Patent Office 2,763,657
Patented Sept. 18, 1956

2,763,657

AMINOMETHYL-SUBSTITUTED AROYLRESORCINOLS

Charles F. H. Allen and James A. Van Allan, Rochester, N. Y., assignors to Eastman Kodak Company, Rochester, N. Y., a corporation of New Jersey No Drawing. Application October 31, 1952, Serial No. 318,095

8 Claims. (Cl. 260—294.7)

This invention relates to aminomethyl-substituted aroylresorcinols which have useful ultraviolet absorbing properties.

The new compounds of our invention can be represented by the folowing general formula:

I.

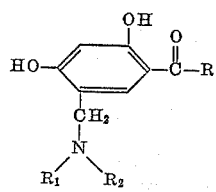

wherein R represents an aryl group, such as phenyl, o-, m-, and p-tolyl, o-, m-, and p-methoxyphenyl, o-, m-, and p-nitrophenyl, etc. (e. g. a monocyclic aromatic group), and $R_1$ and $R_2$ each represents an alkyl group, such as methyl, ethyl, propyl, isopropyl, n-butyl, isobutyl, etc. (e. g. an alkyl group of from 1 to 4 carbon atoms) and $R_1$ and $R_2$ together represent the non-metallic atoms necessary to complete a heterocyclic nucleus of the piperidine or morpholine series. Our invention also embraces the acid-addition salts of the above-formulated compounds, e. g. those of hydrochloric, hydrobromic, sulfuric, phosphoric, p-toluenesulfonic, benzenesulfonic, oxalic, etc. acids.

It is, therefore, an object of our invention to provide new aminomethyl-substituted aroylresorcinols. Still another object is to provide a method for making these new aminomethyl-substituted aroylresorcinols. Another object is to provide ultraviolet absorbing layers containing these new aminomethyl-substituted aroylresorcinols. Other objects will become apparent from a consideration of the following description and examples.

According to our invention we provide the acid-addition salts of the compounds of Formula I above by condensing a compound selected from those represented by the following general formula:

II.

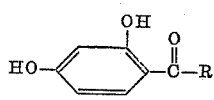

wherein R has the values given above, together with formaldehyde and an amine salt of the following general formula:

III.

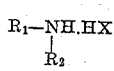

wherein $R_1$ and $R_2$ each have the values given above, and X represents an acid radical, e. g. chloride, bromide, sulfate, etc. The condensations can advantageously be effected in the presence of an inert diluent, e. g. methanol, ethanol, isoamyl alcohol, etc. Heat accelerates the condensations, although temperatures varying from room temperature to the reflux temperature of the reaction mixture can be employed. The formaldehyde can be employed in the form of its highly concentrated aqueous solutions, or more conveniently as paraformaldehyde (trioxymethylene). Especially useful secondary amine salts coming within the scope of Formula III comprise the hydrochlorides of dimethylamine, diethylamine, dipropylamine, diisopropylamine, di-n-butylamine, piperidine, morpholine, ethylmethylamine, etc.

The following examples will serve to illustrate the manner whereby we prepare the acid-addition salts of the compounds of Formula I above.

EXAMPLE 1

4 - benzoyl - 6 - dimethylaminomethylresorcinol hydrochloride

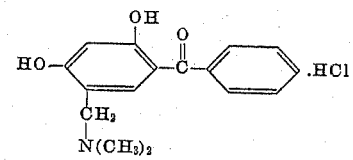

4-benzoylresorcinol, 21.4 g., (0.1 mol), 10 g. (0.25 mol) of trioxymethylene, 20.0 g. (0.25 mol) of dimethylamine hydrochloride, and 150 ml. of 3A alcohol (ethanol) were refluxed for 5 hours, and the mixture then chilled in the ice chest. The white crystalline precipitate was filtered, washed with alcohol, and dried. Yield, 21.0 g.; M. P. 210–212° C. A sample was recrystallized from ethanol for analysis; plate-like white crystals, M. P. 215° C.

Analysis calculated for $C_{16}H_{18}O_3NCl$: C, 62.3; H, 5.8. Found: C, 62.2; H, 6.0.

By replacing the dimethylamine hydrochloride used in the above example by a molecularly equivalent amount of di-n-butylamine hydrochloride, 4-benzoyl-6-di-n-butyl-aminomethylresorcinol hydrochloride having the following formula:

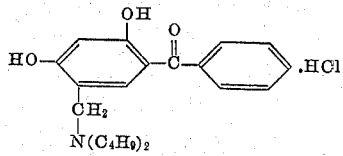

can be obtained.

EXAMPLE 2

4 - benzoyl - 6 - piperidinomethylresorcinol hydrochloride

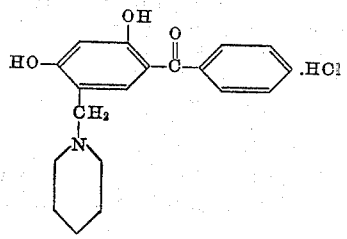

This compound was prepared by replacing the dimethylamine hydrochloride of Example 1 by 0.2 mol of piperidine hydrochloride. The desired product melted at 222° C. and had the following composition:

Analysis calculated for $C_{19}H_{22}O_3NCl$: C, 65.5; H, 6.3. Found: C, 65.3; H, 5.9.

By replacing the 4-benzoylresorcinol used in Example 1 above by a molecularly equivalent amount of 4-p-anisoylresorcinol, 4-p-anisoyl - 6 - dimethylaminomethyl-resorcinol hydrochloride can be obtained.

The free bases of the compounds produced in the above examples can be obtained by treatment of the amine salts with alkali, e. g. aqueous sodium hydroxide, etc. Other salts can be obtained by treatment of the free bases with other acids, or by treatment of an amine salt with an acid salt whose anion produces an amine salt more insoluble than the amine salt treated.

The new aminomethyl-substituted aroylresorcinols of our invention are useful as filters for ultraviolet radiation. They are particularly useful in the preparation of filter layers for photographic elements, such as color photographs on opaque supports, which are susceptible to image degradation due to the effects of ultraviolet radiation. For example, the compound of Example 1 has high absorption of radiation between wavelengths 300 and 400 m$\mu$ (particularly at about 250 m$\mu$) and this absorption does not diminish after 24 hours exposure in the fadeometer. Nor does the compound of Example 1 have any appreciable absorption beyond 400 m$\mu$, or absorb beyond 400 m$\mu$ even after exposure in the fadeometer.

We have also found an improved method for making the compounds of Formula II. Briefly, this process comprises condensing resorcinol (or a nuclear-substituted resorcinol) together with an aromatic carboxylic acid in the presence of boron trifluoride as catalyst. The condensation can advantageously be effected in the presence of an inert diluent, e. g. diethyl ether, tetrachloroethane, etc. Heat accelerates the condensations, it generally being convenient to carry out the condensation on the steam bath.

The following examples illustrate the manner whereby we prepare aroylresorcinols.

EXAMPLE 3

4-(p-anisoyl)resorcinol

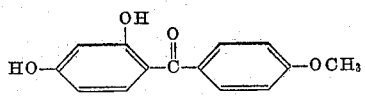

In a 250 ml., 3-necked flask, equipped with a stirrer and inlet tube, and protected from moisture by a drying tube, were placed 22 g. (0.2 mole) of resorcinol, 30 g. (0.2 mole) of anisic acid and 50 ml. of tetrachloroethane. Gaseous boron fluoride was then introduced until the increase in weight was 18 g. The mixture was stirred and heated on the steam bath for 4 hours, then poured into 300 ml. of water containing sodium acetate (55 g.). The precipitate, 57 g. was filtered and dissolved in 400 ml. of 5% sodium hydroxide. Carbon dioxide was passed into this alkaline solution until the solution was weekly alkaline. The precipitate was filtered and dried. The yield was 44 g. 90%, M. P. 158–160° C. The crude product was dissolved in 150 ml. of hot methanol, Norit, 10 g. was added, and the solution was filtered. Water, 50 ml., was added and after 4 hours the white crystalline precipitate was filtered and dried. The recovery was 39.5 g. 81%, M. P. 165° C.

In like manner, by replacing the anisic acid and/or resorcinol of Example 3 with a molecularly equivalent amount of another aromatic carboxylic acid, or substituted resorcinol, other aroylresorcinols were prepared. The results are given in the following table.

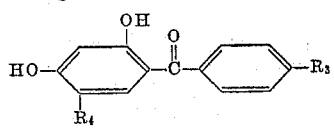

| Example | Aromatic Acid | Phenol | $R_3$ | $R_4$ | M. P., °C. | Calc. C | Calc. H | Calc. C | Calc. H |
|---|---|---|---|---|---|---|---|---|---|
| 4 | p-toluic | Resorcinol | $CH_3$ | H | 139 | 72.7 | 5.3 | 73.0 | 5.2 |
| 5 | p-chlorobenzoic | do | Cl | H | 165 | | | | |
| 6 | p-(2-amyl)benzoic | do | 2-$C_5H_{11}$ | H | (¹) | 75.0 | 8.0 | 74.9 | 7.9 |
| 7 | benzoic | 6-ethylresorcinol | H | $C_2H_5$ | 104 | 74.3 | 5.7 | 74.0 | 5.7 |
| 8 | do | 6-hexylresorcinol | H | $C_6H_{13}$ | 81–82 | 76.7 | 7.7 | 76.4 | 7.3 |
| 9 | do | 6-cyclohexylresorcinol | H | $C_6H_{11}$ | 164 | 77.0 | 6.8 | 77.0 | 6.8 |

¹ Boiled at 235–240° C./0.75 mm.

In like manner our new process can be used to prepare other aroylresorcinols.

What we claim as our invention and desire secured by Letters Patent of the United States is:

1. A compound selected from those represented by the following general formula:

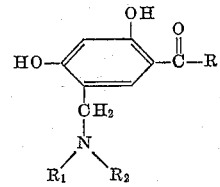

wherein R represents a member selected from the class consisting of phenyl, tolyl, methoxyphenyl, and nitrophenyl, and $R_1$ and $R_2$ represent members selected from the class consisting of (1) alkyl groups containing from 1 to 4 carbon atoms, (2) together $R_1$ and $R_2$ represent the non-metallic atoms necessary to complete a piperidine nucleus, and (3) together $R_1$ and $R_2$ represent the non-metallic atoms necessary to complete a morpholine nucleus.

2. A compound selected from those represented by the following general formula:

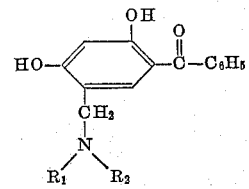

wherein $R_1$ and $R_2$ each represents an alkyl group containing from 1 to 4 carbon atoms.

3. The compound having the following formula:

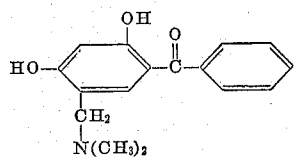

4. The compound having the following formula:

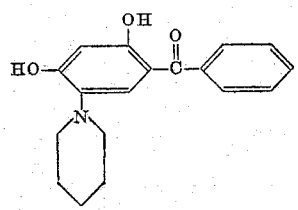

5. A process for preparing aminomethyl-substituted aroylresorcinols comprising condensing a compound selected from those represented by the following general formula:

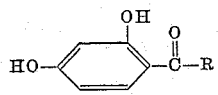

wherein R represents a member selected from the group consisting of phenyl, tolyl, methoxyphenyl, and nitrophenyl, together with formaldehyde and a compound selected from those represented by the following general formula:

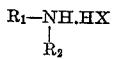

wherein $R_1$ and $R_2$ represent members selected from the class consisting of (1) alkyl groups containing from 1 to 4 carbon atoms, (2) together $R_1$ and $R_2$ represent the non-metallic atoms necessary to complete a piperidine nucleus and (3) together $R_1$ and $R_2$ represent the non-metallic atoms necessary to complete a morpholine nucleus and X represents an anion.

6. A process according to claim 5 wherein the formaldehyde is formed in situ from trioxymethylene.

7. A process for preparing 4-benzoyl-6-dimethylaminomethyresorcinol hydrochloride comprising condensing 4-benzoylresorcinol together with trioxymethylene and dimethylamine hydrochloride.

8. A process for preparing 4-benzoyl-6-piperdinomethylresorcinol hydrochloride comprising condensing 4-benzoylresorcinol together with trioxymethylene and piperidine hydrochloride.

References Cited in the file of this patent
UNITED STATES PATENTS

| | | |
|---|---|---|
| 2,419,553 | Houtman | Apr. 29, 1947 |
| 2,484,621 | Hardman | Oct. 11, 1949 |
| 2,513,173 | Hems et al. | June 27, 1950 |
| 2,565,300 | Faith et al. | Aug. 21, 1951 |
| 2,568,894 | Mackey | Sept. 25, 1951 |
| 2,580,494 | Wilder et al. | Jan. 1, 1952 |